(12) United States Patent
Glynn et al.

(10) Patent No.: US 8,797,888 B2
(45) Date of Patent: Aug. 5, 2014

(54) VOIP QUALITY BAR AND "TOAST" NOTIFICATIONS

(75) Inventors: Fergal Glynn, Medford, MA (US); Kerry Hannigan, Harvard, MA (US); Christopher J. Kacher, Concord, MA (US); Mike Regan, Salem, NH (US)

(73) Assignee: Aspect Software, Inc., Chelmsford, MA (US)

( * ) Notice: Subject to any disclaimer, the term of this patent is extended or adjusted under 35 U.S.C. 154(b) by 494 days.

(21) Appl. No.: 11/890,009

(22) Filed: Aug. 2, 2007

(65) Prior Publication Data

US 2008/0031425 A1 Feb. 7, 2008

Related U.S. Application Data

(60) Provisional application No. 60/835,376, filed on Aug. 3, 2006.

(51) Int. Cl.
*H04L 12/26* (2006.01)
*H04M 3/22* (2006.01)
*H04L 12/66* (2006.01)

(52) U.S. Cl.
CPC *H04M 3/22* (2013.01); *H04L 12/66* (2013.01)
USPC .......................................... 370/252

(58) Field of Classification Search
CPC ................. H04M 3/22; H04L 12/66
USPC ......... 370/252, 329, 338, 401, 260, 352, 356; 709/227, 228
See application file for complete search history.

(56) References Cited

U.S. PATENT DOCUMENTS

| | | | |
|---|---|---|---|
| 6,831,969 B2* | 12/2004 | Ju | 379/142.16 |
| 7,167,451 B1* | 1/2007 | Oran | 370/252 |
| 7,502,337 B2* | 3/2009 | Kosanovic et al. | 370/286 |
| 7,515,583 B2* | 4/2009 | Kamani et al. | 370/352 |
| 7,542,761 B2* | 6/2009 | Sarkar | 455/423 |
| 2003/0156707 A1* | 8/2003 | Brown et al. | 379/265.06 |
| 2004/0208133 A1* | 10/2004 | Jay et al. | 370/252 |
| 2005/0015253 A1* | 1/2005 | Rambo et al. | 704/246 |
| 2007/0010259 A1* | 1/2007 | Hoffmann | 455/456.1 |
| 2007/0183405 A1* | 8/2007 | Bennett | 370/352 |
| 2010/0085897 A1* | 4/2010 | Croak et al. | 370/254 |

* cited by examiner

*Primary Examiner* — Dang Ton
*Assistant Examiner* — Nourali Mansoury
(74) *Attorney, Agent, or Firm* — Husch Blackwell LLP

(57) ABSTRACT

The present invention provides in one aspect a method and a system for displaying a VoIP quality to a user, so that the user may determine if a specific call should be placed in view of the VoIP quality. The present invention also provides in another aspect a method and a system for non-intrusively signaling of an incoming VoIP call so that a user can be informed of the incoming call and yet not be interrupted from his/her current work.

23 Claims, 5 Drawing Sheets

US 8,797,888 B2

VOIP QUALITY BAR AND "TOAST" NOTIFICATIONS

RELATED APPLICATION

This application claims priority to U.S. Provisional Patent Application Ser. No. 60/835,376, filed Aug. 3, 2006, the contents of which are hereby incorporated by reference.

FIELD OF THE INVENTION

The present invention relates generally to a Voice over Internet Protocal (VoIP) environment, and more particularly to a method, system, and medium for providing an indication of voice quality and non-intrusive indications of incoming calls in the VoIP environment.

BACKGROUND OF THE INVENTION

The conventional telephony network allows users to communicate with each other through a central system of switches, which can be referred to as telephone exchanges. The telephone exchanges provide electrical or optical switches to connect users and allow communication. The conventional telephony network is often referred to as the Public Switched Telephone Network (PSTN). The switches and other equipment necessary to make a connection can be located, for example, in central offices (COs) and in customer premises. The PSTN can have local exchanges that allow a user to call another user of the PSTN through COs of the local exchange. The PSTN can also have long lines that allow long distance call transmission, such that a user can call another user on the PSTN that is not part of the local exchange. In this case, the call may be routed through multiple COs until the call reaches the called party's local exchange.

In recent years, Voice over Internet Protocol (VoIP) has provided an alternative to conventional telephone exchanges. VoIP is the routing of voice conversations over the Internet or other IP-based network. VoIP is a technology that allows a user to make telephone calls using an Internet connection instead of a traditional (analog) phone line connection. VoIP converts the voice signal from a telephone or a computer into a digital signal that travels over the Internet then converts it back at the other end so that a user can speak to anyone with a regular phone number or anyone who also uses VoIP technology. VoIP uses the Internet as the transmission medium for telephone calls by sending voice data in packets using IP rather than sending an analog signal over the PSTN.

Because IP does not provide a mechanism to ensure that voice data packets are delivered in sequential order, or provide any quality of service (QOS) guarantees, VoIP implementations face problems dealing with latency and jitter. Some broadband connections may have less than desirable quality. A momentary drop-out of voice is experienced when IP packets are lost or delayed at any point between the VoIP users. This is a common problem in highly congested networks and/or where there is a long distance routing of the call between end points. Currently, before making a VoIP call, a user is not able to know if the underlying network is able to support a high quality call between the user and the call receiver, wherever the user and the call receiver might be.

With a conventional telephone call, a party is aware of an incoming call when the telephone rings. Currently, when a VoIP call is received via a computer, a window is popped up on the screen on top of all other windows to show that an incoming call is detected. This window has the highest z-order and may obscure other windows that a party already has open. The window remains open until the user takes steps to close it. Such a window for an incoming call is intrusive and interrupts a user from his/her current work.

SUMMARY OF THE INVENTION

The present invention provides in one aspect a method and a system for displaying an indication of VoIP call quality to a user, so that the user may determine if a specific call should be placed in view of the VoIP quality. The present invention also provides in another aspect a method and a system for non-intrusively signaling of an incoming VoIP call so that a user can be informed of the incoming call and yet not be interrupted from his/her current work.

In one aspect of the present invention, a method for presenting quality of a voice call over a network is provided. The method includes obtaining a caller location; obtaining a condition of a network; determining a quality of a potential voice call over the network; and displaying the quality of the potential voice call. The network may include a local network at the caller location, a local network at a callee location, and/or a network between the caller location and a callee location.

In one embodiment of the present invention, displaying an indication of the quality of the voice call includes providing a bar indicator; and displaying a portion of the bar indicator, wherein a size of the displayed indicator corresponds to a quality of the potential voice call. In another embodiment of the present invention, displaying the quality of the voice call includes providing a light indicator, wherein the indicator can display a plurality of colors and each of the plurality of colors corresponds to a specific quality of the potential voice call. In a further embodiment of the present invention, the method further includes assessing the condition of the network. The method may further include obtaining a mapping between the condition of the network and the quality of the voice call. In one embodiment of the present invention, the method is performed on a soft phone or a wireless VoIP phone. In another embodiment of the present invention, the method is performed on a laptop or a desktop.

In another aspect of the present invention, a method for presenting an incoming voice call on a communication device is provided. The method includes detecting an incoming voice call on a communication device; and displaying a toast pop-up window. The toast pop-up window may include a caller ID and or a subject line of the incoming voice call. The pop-up window may provide an option to answer the call, transfer the call, send the call to a voice mail, redirect the call to a desk phone or a cellular phone, filter the call, or block the call. The toast pop-up window may provide an option to store a phone number of the incoming voice call into a database.

In one embodiment of the present invention, the method further includes mapping a phone number of the incoming voice call with information in a database; and including the information in the toast pop-up window. In another embodiment of the present invention, the method may further include displaying in the toast pop-up window a number that is called by a caller of the incoming voice call. The method may also further include the step of determining what to do with the incoming voice call depending on the number that is called by the caller of the incoming voice call. In still another embodiment of the present invention, the method may further include the step of including in the toast pop-up window an indicator showing a level of urgency of the incoming voice call.

In yet another aspect of the present invention, a system of presenting quality of a voice call over a network is provided. The system includes a display for displaying a quality of a potential voice call over a network; and a voice quality indicator for determining the quality of the potential voice call by using a caller location and a condition of the network and presenting the quality of the potential voice call on the display. The network includes at least one of a local network at the caller location, a local network at a callee location, and a network between the caller location and the callee location. In one embodiment of the present invention, the system further includes a network assessment tool for determining the condition of the network for placing the potential voice call. In another embodiment of the present invention, the voice quality indicator comprises a bar indicator, wherein a greater displayed portion of the bar indicator corresponds to a better quality voice call. In another embodiment of the present invention, the voice quality indicator comprises a light indicator, wherein the indicator can display a plurality of colors and each of the plurality of colors corresponds to a specific quality of the potential voice call.

In still another embodiment of the present invention, a system of presenting an incoming voice call on a communication device is provided. The system includes a display for displaying a notification indicating that an incoming call is detected; and a toast pop-up window that is displayed on the display when the incoming call is detected. In one embodiment of the present invention, the system further includes a rule-based system for determining what to do with the incoming call. In another embodiment of the present invention, the rule-based system determines what to do with the incoming call based on at least one of a number that is called by a caller of the incoming call, a level of urgency of the incoming call, a subject line of the incoming call, a telephone number associated with the incoming call, and a caller ID of the incoming call. In still another embodiment of the present invention, the toast pop-up window includes at least an option for answering the call, transferring the call, sending the call to a voice mail, redirecting the call to a desk phone or a cellular phone, blocking the call, filtering the call, or storing a telephone number of the call into a database. In yet another embodiment of the present invention, the toast pop-up window includes at least one of a caller ID, a subject line of the call, an indicator showing a level of urgency of the call, database information that is mapped to the call, a number that is called by a caller of the call, and a telephone number of the call.

In still another embodiment of the present invention, a medium storing computer-executable instructions for a method for presenting quality of a voice call over a network is provided. The method includes obtaining a caller location; obtaining a condition of a network; determining a quality of a potential voice call over the network; and displaying the quality of the potential voice call.

In yet another embodiment of the present invention, a medium for storing computer-executable instructions for a method for presenting an incoming voice call on a communication device is provided. The method includes detecting an incoming voice call on a communication device; and displaying a toast pop-up window.

BRIEF DESCRIPTION OF THE DRAWINGS

The foregoing and other objects, aspects, features, and advantages of the invention will become more apparent and may be better understood by referring to the following description taken in conjunction with the accompanying drawings, in which.

DETAILED DESCRIPTION

The present invention provides in one aspect a method and a system for displaying a VoIP quality to a user, so that the user may determine if a specific call should be placed in view of the VoIP quality. The present invention prevents a user from being frustrated by a bad quality VoIP call. In the case where the network is not capable of delivering a high enough quality voice call, the user can choose to use the traditional PSTN to make a phone call instead. The present invention may also provide a user with a convenient and easy way to find out if a VoIP can be made. The present invention also makes the VoIP technology more appealing to a user because now the user has access to essential information that the user can rely on for a VoIP call.

The present invention may also provide in another aspect a method and a system for non-intrusively signaling of an incoming VoIP call so that a user can be informed of the incoming call and yet not be disrupted from his/her current work. A call "toast" is provided to give a non-intrusive signaling of an incoming VoIP call. A toast is a notification message that fades in and fades out of a display of a communication device so that the user of the communication device can be notified of the incoming call and not being disrupted from the current task. The call toast can include information that identifies the caller, the subject, and/or other useful information. The call toast can also include options for redirecting/transferring the call.

Figure 1:
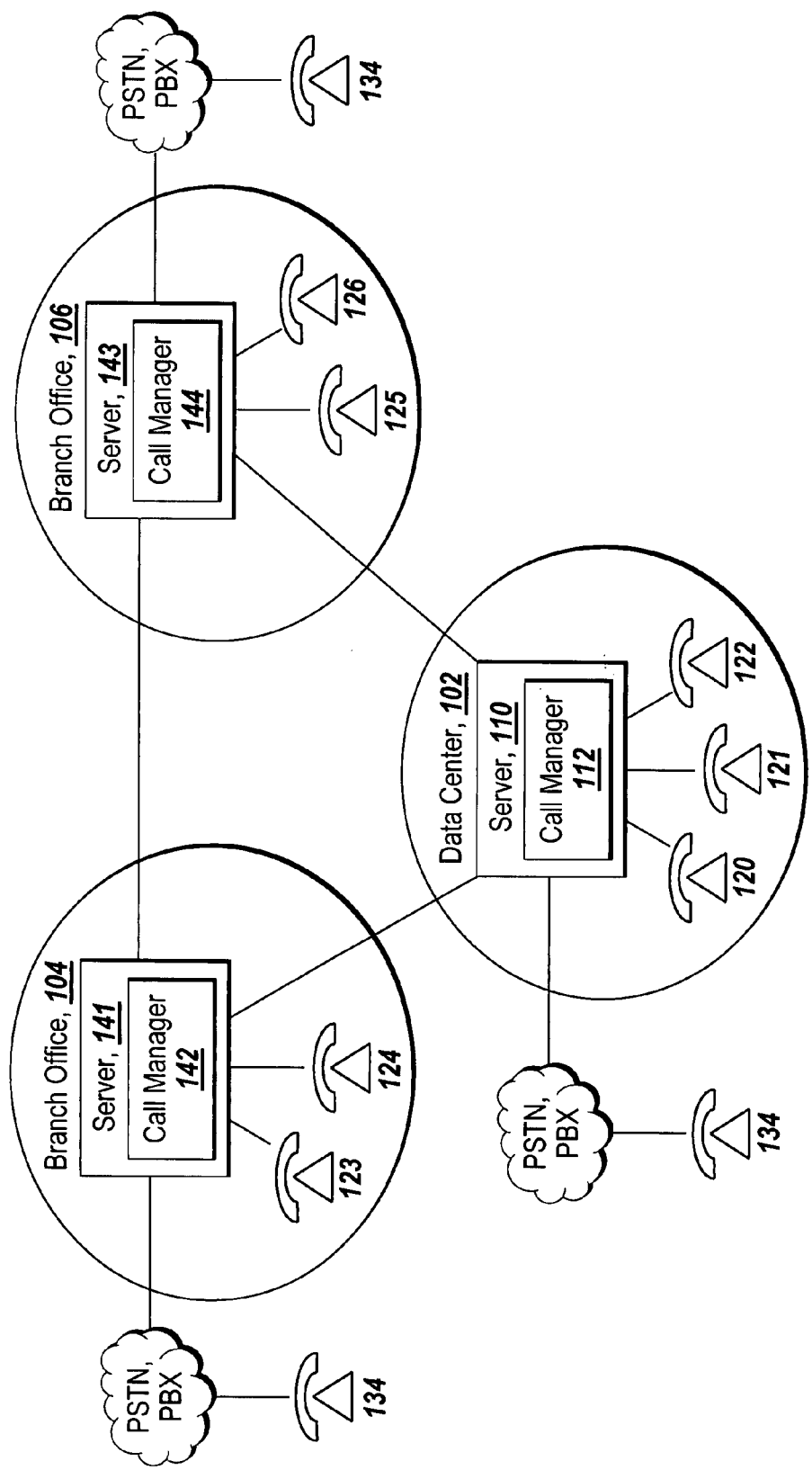
FIG. 1 illustrates an exemplary VoIP network that is suitable to practice one embodiment of the present invention.

FIG. 1 depicts an example of an illustrative VoIP network 100 that can be implemented in accordance with the present invention. The VoIP network 100 includes a data center 102, a branch office 104 and a branch office 106.

One skilled in the art will recognize that the VoIP network 100 is merely an illustrative example and that a myriad of different configurations can be formed within the scope of the present invention. Further, it will be recognized by one skilled in the art that the VoIP network can be configured without branch offices or without a data center or the VoIP network 100 can include multiple data centers. The protocol used in the VoIP network can include, but not limited to, Session Initiation Protocol (SIP), H.323, Skype, Jingle, Inter-Asterisk eXchange (IAX), SCCP (Skinny Client Control Protocol).

Communication devices 120-126 can be a computing device that can originate and receive calls and can include a software based phone. The communication devices can also be a SIP phone, a wireless VoIP phone, a personal digital assistant (PDA), a laptop, a desktop, or any other device that is capable of receiving and/or originating a voice call in a VoIP network.

The data center 102 includes a server 110 with a call manager program 112 that is loaded on the server 110, a communication device 120, a communication device 121 and a communication device 122. The server 110 is connected to each of the communication devices 120-122. The server 110 can also connect to the PSTN and a PBX.

The call manager 112 is a computer program that controls communications among the communication devices 120-122 of the data center as well as between the communication devices of the data center and the branch office 104 or the branch office 106. The call manager 112, for example, allows the communication device 120 to call the communication device 121. The call manager 112 also enables the communication devices 120-122 to call phones on the PSTN and a PBX. The call manager can, for example, allow the communication device 120 to call a phone 134 on the PSTN or a PBX. An example of the call manager 112 is SESSIONSUITE™ from BlueNote Networks, Inc. of Tewksbury, Mass.

The branch office 104 includes a server 141 with a call manager program 142, and the branch office 106 includes a server 143 with a call manager program 144. The call managers 142 and 144 can provide identical functionality as the call manager 112. The branch office 104 includes a communication device 123 and a communication device 124. The branch office 106 includes a communication device 125 and a communication device 126. The data center, the branch offices 104, and the branch office 106 can be connected using a virtual private network (VPN).

The data center 102, the branch office 104 and the branch office 106 can each have multiple servers, where each server includes a call manager. For example, each of the data center 102, the branch office 104 and the branch office 106 can include a second sever with a second call manager to process calls. The multiple call managers can provide multiple routing paths for calls made on the VoIP network and can also increase the number of calls each of the data center 102, the branch office 104 and the branch office 106 can process.

The communication device 122 of the data center 102 can communicate with the communication device 124 of the branch office 104 or with the communication device 125 of the branch office 106 by originating a call that is processed by the call manager 112, which sends the call to the call manager 142 or 144, which in turn, processes the call and sends it the communication device 124 or 125, respectively. The call managers 142 and 144 also allow the communication devices 124 and 125 to communicate with a phone 134 on the PSTN or a PBX.

Figure 2A:
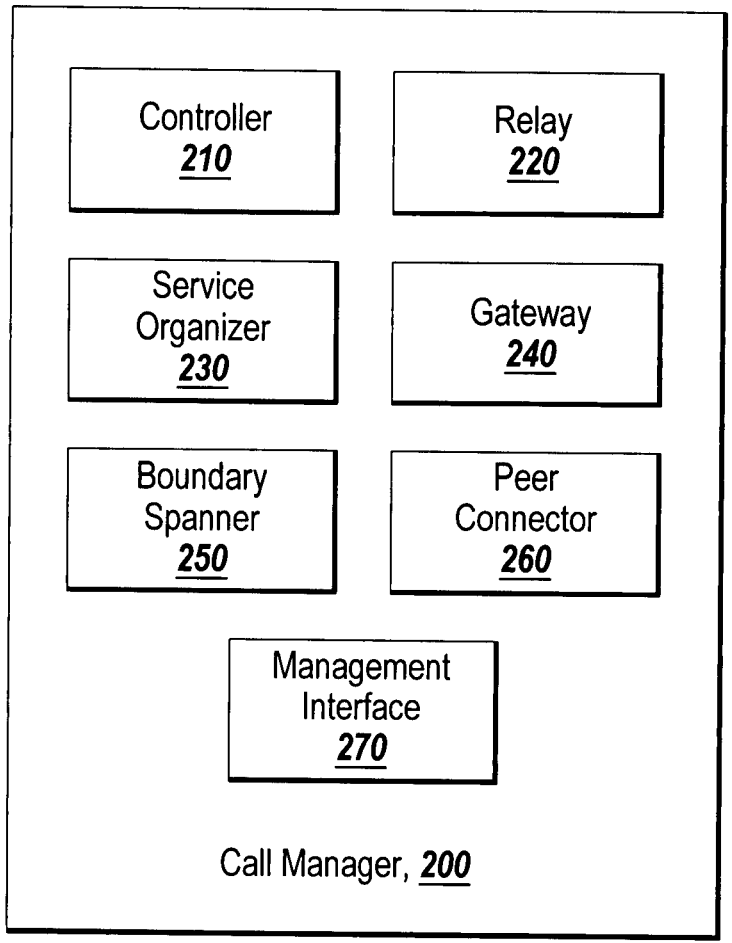
FIG. 2A illustrates the details of the call mangers in FIG. 1 in detail in accordance with one embodiment of the present invention.

FIG. 2A depicts the call managers 112, 142 and 144 in more detail. For clarity, unless otherwise stated, the call managers 112, 142 and 144 will hereinafter be commonly referred to as call manager 200. The call manager 200 includes a controller 210, a relay 220, a service organizer 230, a gateway 240, a boundary spanner 250, a peer connector 260 and a management environment 270. An example of the call manager 200 can be SESSIONSUITE™ from BlueNote Networks, Inc. of Tewksbury, Mass.

The controller 210 supplies fundamental session initiation protocol (SIP) capabilities including, but not limited to SIP Proxy, SIP Redirector, and SIP Registrar functions. The controller 210 can be RFC 3261 compliant and can provide a standards-based core signaling and control infrastructure. The controller 210 provides advanced admission control capabilities allowing VoIP calls to be rejected if insufficient resources are available to complete a call with acceptable quality and can integrate directly with enterprise information technology (IT) infrastructure such as RADIUS AAA servers and LDAP policy servers, thereby, allowing voice to be treated and managed in a manner similar to other IP applications.

The service organizer 230 can be used in conjunction with the controller 210 and provides traditional voice calling and point-to-point video features as a pure software solution. The service organizer 230 can deliver popular PBX calling functions along with value-added features such as voicemail, conference bridging, and Interactive Voice Response (IVR) and works with a wide variety of standards-based soft phones, SIP phones, and traditional analog telephones.

The gateway 240 bridges VoIP networks and traditional PSTN/PBX infrastructures, allowing VoIP users to place and receive calls with PBX users or users of the PSTN network. The gateway 240 works with standards-based third party analog and digital line adapters, and supports a variety of interfaces including TI CAS, ISDN PRI, and analog FXS/FXO.

The boundary spanner 250 delivers flexible and integrated boundary solutions for NAT and firewall traversal. Modern enterprise networks are comprised of independent networks with unique address spaces. NAT devices are used to connect with external networks, while firewall technology is used to protect the local network from the outside world. The boundary spanner 250 can enable SIP-controlled communications flows through firewall and NAT boundaries. The boundary spanner 250 can be used to extend corporate voice services to Internet-enabled mobile workers, or Internet-connected affiliates of an enterprise such as subsidiaries and suppliers.

The peer connector 260 provides connectivity and interoperability with external services, service providers and hosting facilities. The peer connector 260 can traverse firewalls and NAT devices that separate a service provider from a service subscriber. The peer connector 260 can provide additional naming and can identify features that allow enterprises to gain access to, use and manage external services.

The management environment 270 can be a Web-based application that manages the call manager 20 as well as services, resources, sessions, users and clients of the VoIP network 100. The management environment 270 can provide a common Web browser interface for managing all of the software components of the call manager, and offers integrated fault, configuration, performance and security management for all the call manager 200 functions. The management environment 270 can provide a user portal that allows subscribers of the services 230 to manage call handling and voicemail features through a secure Web browser. The management environment 270 can provide an XML/SOAP interface for integration with third-party or customer-developed management applications and networks.

The relay 220 provides voice and video traffic forwarding and switching under the control of the controller 210. The relay 220 can supply compression and transcoding and can support a variety of CODECs including, but not limited to G.711 variants, G.729 variants, and GSM for voice; and H.263 and H.264 for video.

Figure 2B:
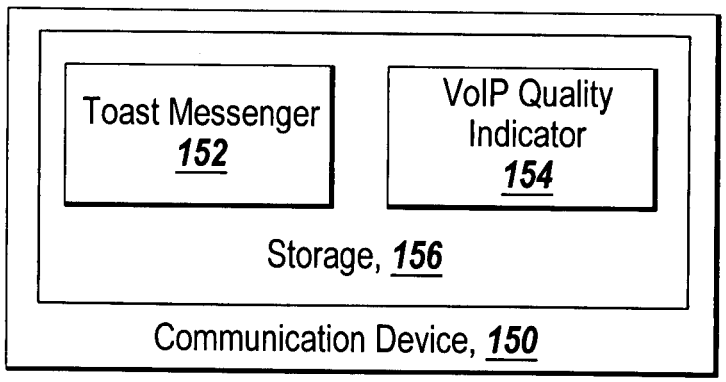
FIG. 2B illustrates the details of the communication devices in FIG. 1 in detail in accordance with one embodiment of the present invention.

FIG. 2B depicts the communication devices in FIG. 1 in more detail. A communication device 150 includes a storage 156 for storing data and applications. Storage 156 may comprise a computer system memory, FLASH memory, or random access memory such as DRAM, SRAM, EDO RAM, MRAM, etc. The storage 156 may comprise other types of memory as well, or combinations thereof. Storage 156 includes a VoIP quality indicator 154 for displaying a quality of the VoIP network to deliver a voice call. The storage 156 also includes a toast messenger 152 for notifying a user when an incoming call is detected.

Figure 3:
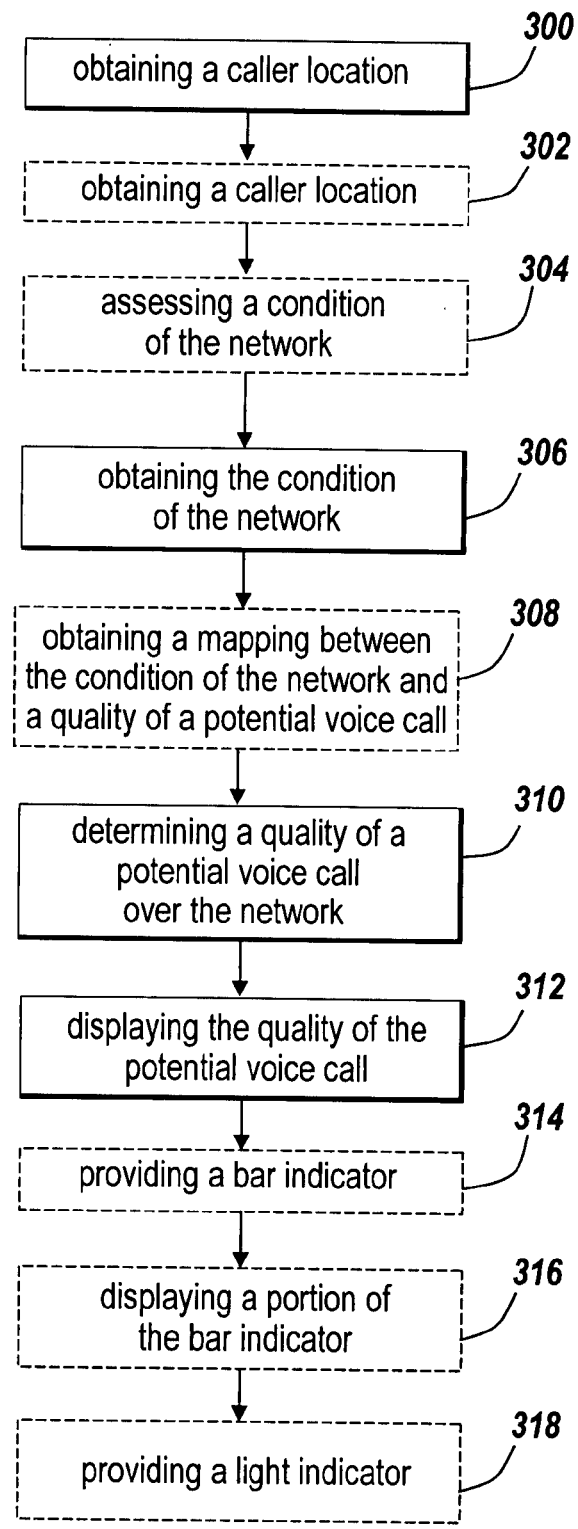
FIG. 3 illustrates a flowchart depicting steps taken to display a VoIP quality to a user in accordance to one embodiment of the present invention.

FIG. 3 illustrates a flowchart for displaying a condition of the VoIP network on a communication device in accordance with one embodiment of the present invention. In step 300, the VoIP quality indicator 154 obtains a caller location. The VoIP quality indicator 154 can optionally obtain a callee location at step 302. A condition of the network can be optionally assessed by the VoIP quality indicator 154 in step 304. The network can include, but not limited to, a local network at the caller location, a local network at the callee location, and/or a network between the caller location and the callee location.

In one embodiment of the present invention, the condition of the network can be assessed by using a Mean Opinion Score (MOS) scoring system. Voice quality is given a score from 1 to 5 where 1 represents the lowest quality and 5 the highest quality. A software model developed by the International Telecommunication Union (ITU) called the ITU-T G.107 or E-Model can be used to calculate a MOS score for a given VoIP session. The model can be used to predict the average voice quality of calls processed by a network, based upon mathematical estimates of the effects of delay, jitter, packet loss, and codec performance. The model generates an R rating that rates a network from 0 and 100, with 100 indicating the best quality. The R rating is an estimate of the quality that can be expected if the network is realized the way it is in the model.

In another embodiment of the present invention, the condition of the network can be assessed by using a Perceptual Evaluation of Speech Quality (PESQ) or ITU-T Rec. P.862 scoring system. The PESQ scoring system measures and quantifies voice quality in terms of customer perception. PESQ is suitable for testing voice quality across a range of networks, including PSTN, mobile, and VoIP. PESQ can take into account coding distortions, errors, packet loss, variable delays, filtering, noise, and jitter.

In yet another embodiment of the present invention, the condition of the network can be assessed by using a Real-Time transport protocol (RTP) control protocol extended reports (RTCP XR) from Internet Engineering Task Force. RTCP XR includes report blocks that add information to the TRCP packet streams transmitted to VoIP endpoints. The extended report blocks provides a way to send information from Internet protocol (IP) endpoints that can be used for assessing voice quality and reasons for degradation. Seven block types are currently defined to be used with the report blocks. The seven block types can contain information on received packet losses, packet duplicates, packet reception times, receiver reference time information, receiver inter-report delays, detailed reception statistics, and voice quality metrics. One of ordinary skill in the art will appreciate that the present invention is not limited to the specific method used to assess the condition of the network and exemplary method mentioned herein should be not used to limit the scope of the present invention.

Still referring to FIG. 3, the VoIP quality indicator 154 obtains in step 306 the condition of the network. The VoIP quality indicator 154 can optionally obtains from a storage 156 a mapping between the condition of the network and a quality of a potential voice call from the caller location to the callee location. The VoIP quality indicator 154 determines in step 310 a quality of the potential voice call from the condition of the network and displays the quality of the potential voice call in step 312. In one embodiment of the present invention, a bar indicator is provided in step 314 to display the quality of the potential voice call. A portion of the bar indicator can be displayed to indicate the quality of the potential voice call in step 316.

Figure 5A:
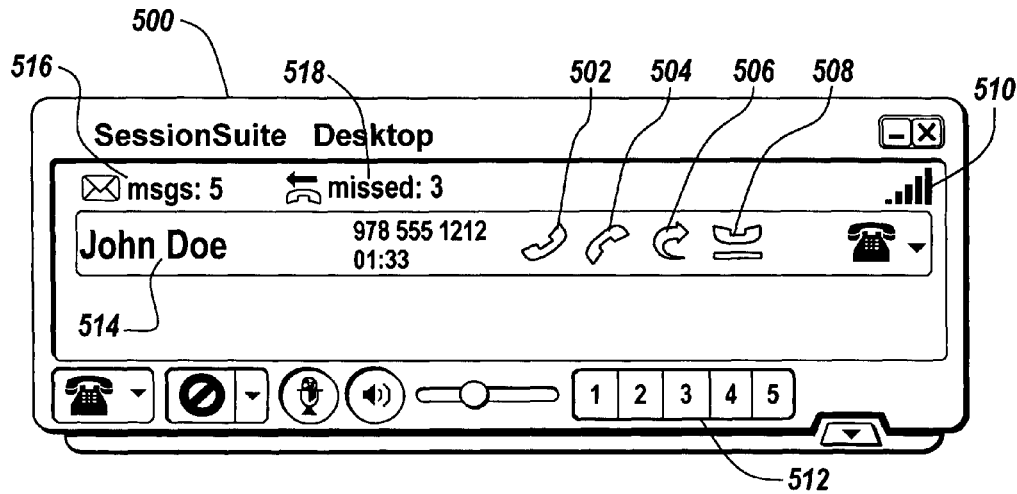
FIG. 5A illustrates an exemplary graphical user interface (GUI) that uses a bar to display a voice quality of a VoIP call in accordance to one embodiment of the present invention.

FIG. 5A illustrates an exemplary GUI that uses a bar indicator for displaying voice quality. A soft phone window 500 includes a field 514 for displaying name and the number dialed. The soft phone window 500 further includes an indicator 516 showing the number of messages in the voice mail and an indicator 518 for showing the number of calls missed. The soft phone window 500 also includes speed dial buttons 512 where each button corresponds to a stored number that can be dialed immediately by pressing the button or the number corresponding to the button. Button 502 can be used to answer a call, whereas button 504 can be used to hang up a call. Button 506 allows a call to be transferred and button 508 allows a call to be put on hold. The soft phone window 500 includes a bar indicator 510 that shows the voice quality of a VoIP call. More portions of the bar being displayed correspond to better voice quality. Although the appearance of the bar indicator may look like a signal strength bar in a cellular phone or a wireless device, the bar indicator of the present invention is an indication of voice quality of a VoIP network and not a signal strength of the network that a user is currently in. For example, a user may have excellent signal strength, but due to poor connectivity at the callee location, heavy network traffic anywhere between the caller location and the callee location, or other factors, the bar indicator would indicate a bad voice quality despite the good signal strength.

Figure 5B:
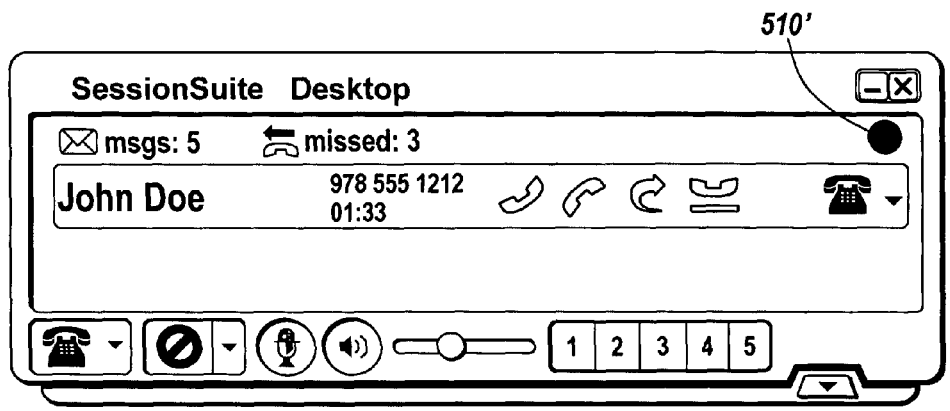
FIG. 5B illustrates an exemplary GUI that uses a color indicator to display a voice quality of a VoIP call in accordance to one embodiment of the present invention.

Referring back to FIG. 3, instead of a bar indicator, a light indicator can be provided in step 318. The light indicator can employ different colors to correspond to different quality of the potential voice call. For example, red can be used to represent a bad quality call, while yellow represents a mediocre quality and green represents a good quality. FIG. 5B illustrates an exemplary GUI that uses a light indicator 510' to show a voice quality. The light indicator 510' can change color according to the voice quality of a VoIP call. One of ordinary skill in the art will appreciate that there are many different ways that one may choose to represent a quality of the voice call and the specific methods mentioned herein should not be used to limit the scope of the present invention.

Figure 4:
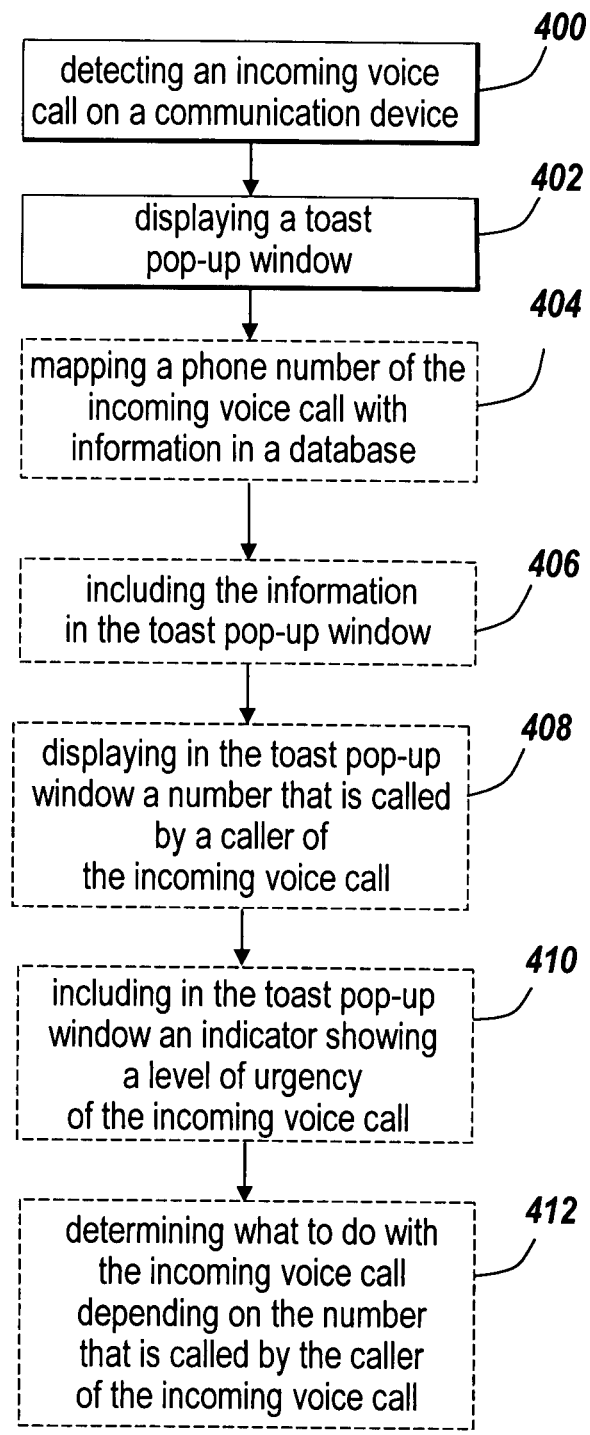
FIG. 4 illustrates a flowchart depicting steps taken to signal an incoming VoIP call in accordance to one embodiment of the present invention.

FIG. 4 is a flowchart depicting steps taken to signal an incoming VoIP call in accordance to one embodiment of the present invention. In step 400, an incoming VoIP call is detected by a toast messenger 152 on a communication device 150. The toast messenger 152 displays a toast pop-up window in step 402. The toast pop-up window fades in when an incoming call is detected on the communication device. The toast pop-up window shows itself for a few seconds, and then fades out. In one embodiment of the present invention, when a user moves the mouse over the toast pop-up window, the window can change to an opaque color immediately, and not fade out until the mouse moves out of the window. In another embodiment of the present invention, the toast pop-up window can pop up at a bottom corner of a display and goes down as opposed to fading. The toast pop-up window can have graphical user interface elements that provide links or options that allow a user to click to select an action (such as, answering the call, or sending the call to voice mail) or see additional information. The toast messenger 152 may optionally in step 404 maps a phone number of the incoming call with information in a database, such as a telephone number database, a contact list database, an electronic mail application, records in a file or folder, an event calendar. In step 406, the mapped information can optionally be included in the toast pop-up window and/or a link can be provided in the toast pop-up window for easy access by a user. In step 408, a number that is called by the caller of the incoming call can be optionally displayed in the toast pop-up so that if the communication device can accept calls for different numbers, a user can distinguish which number was called. Alternatively, a different ring tone, a different color background for the toast pop-up window, or a different type of the toast pop-up window can be used to help a user to distinguish which number is used by a caller.

Figure 5C:
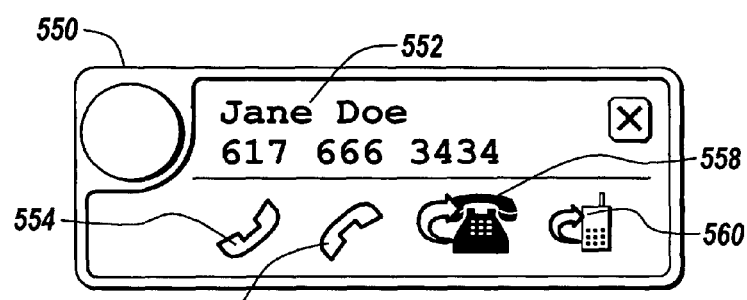
FIG. 5C illustrates an exemplary GUI for a toast notification in accordance to one embodiment of the present invention.

FIG. 5C illustrates an exemplary GUI for a toast notification. Toast window 550 includes a field 552 that displays a name of the person who is calling and a number of the person uses to make the call. The toast window 550 includes different options for handling the incoming call. Toast window 550 includes an option 554 for a user to answer the call, an option 556 to hang up the call, an option 558 to transfer the call to a desk phone, and an option 560 to transfer the call to a cellular phone. One of ordinary skill in the art will appreciate that many more options may be included in a toast window and the illustrated embodiments and exemplary options and features listed herein should not be used to limit the scope of the present invention.

Referring back to FIG. 4, an indicator can be provided in step 410 to show a level of urgency or priority of the incoming call in the toast pop-up window so that a user knows if it is an urgent call that the user should answer immediately. Alternatively, different ring tones or different types of toast pop-up window can be used to distinguish urgent and non-urgent calls. The toast messenger 152 may include a rule based system that determines what to do with the incoming call in step 412. For example, a user can create rules where a VoIP call to the communication device is redirected to a desk phone or a cellular phone. The call can also be transferred to another number or send to a voice mail. For example, if a user sets his/her status to indicate to a caller that he/she is in a meeting, the rule based system can use the status to determine what to do with the call, and in this case, the rule based system can choose to automatically send the call to a voice mail. In another example, a user that is traveling between work sites on certain days can have the rule based system to transfer all calls on those certain days to a cellular phone that the user carries to different work sites. A user can also create rules to filter calls to the communication device and/or block unwanted calls. The toast pop-up window may include information such as caller ID, subject line of the call, and options to answer the call, send the call to an answering machine, redirect/transfer the call, filter the call, and etc. The toast pop-up window may also include an option to store a phone number of the call into a database for easy access in the future. One of ordinary skill in the art will appreciate that there may be many different options that the toast pop-up window can include, and the exemplary listings herein should not be used to limit the scope of the present invention. The information included in the toast pop-up window may help a user to determine if the call needs to be answered immediately.

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

We claim:
1. A method for presenting voice quality different from signal strength of a specific potential voice call by a caller over a VoIP network before the specific potential VoIP call is made, the method comprising:
   obtaining a caller location;
   obtaining a condition of the network relating to voice quality of the specific potential call to be processed by the network;
   predicting a voice quality different from signal strength of the specific potential voice call over the network based upon the condition of the network and the caller location calculated as a VoIP voice quality of a model VoIP session of the VoIP network for delivery of the potential VoIP call;
   obtaining a mapping between the condition of the network and the voice quality of the potential voice call; and
   displaying the voice quality of the specific potential voice call prior to completing the call to enable the caller to determine if the specific potential call should be placed based on the display voice quality.

2. The method of claim 1, wherein the VOIP network includes a local network at the caller location including admission control allowing calls to be rejected if insufficient resources are available.

3. The method of claim 1, wherein the network includes a local network at a callee location.

4. The method of claim 1, wherein the network includes a network between the caller location and a callee location.

5. The method of claim 1, wherein displaying the quality of the voice call comprises:
   providing a bar indicator; and
   displaying a portion of the bar indicator, wherein a greater displayed portion corresponds to a better quality of the potential voice call.

6. The method of claim 1, wherein displaying the quality of the voice call comprises:
   providing a light indicator, wherein the indicator can display a plurality of colors and each of the plurality of colors corresponds to a specific quality of the potential voice call.

7. The method of claim 1, further comprising:
   assessing the condition of the network.

8. The method of claim 1, wherein the method is performed on a soft phone or a wireless VoIP phone.

9. The method of claim 1, wherein the method is performed on a laptop or a desktop and wherein the voice quality is determine in terms of customer perception.

10. A system of presenting voice quality different from signal strength of a specific potential VoIP voice call to be made by a caller over a VoIP network, said system comprising:
   a display for displaying a voice quality of the specific potential voice call over the network to enable the caller to determine based on the displayed voice quality whether the specific potential voice call should be made; and
   a voice quality indicator for predicting the voice quality different from signal strength of the potential voice call by using a caller location of the caller and a condition of the network relating to voice quality of the specific potential call to be processed by the network calculated as a VoIP voice quality of a model VoIP session of the VoIP network for delivery of the potential VoIP call and obtaining a mapping between the condition of the network and the voice quality of the potential voice call, and presenting the voice quality of the specific potential voice call on the display prior to completing the potential call.

11. The system of claim 10, further comprising:
a network assessment tool for determining the condition of the network for placing the potential voice call.

12. The system of claim 10, wherein the voice quality indicator comprises a bar indicator, wherein a greater displayed portion of the bar indicator corresponds to a better quality of the potential voice call.

13. The system of claim 10, wherein the voice quality indicator comprises a light indicator, wherein the indicator can display a plurality of colors and each of the plurality of colors corresponds to a specific quality of the potential voice call.

14. The system of claim 10, wherein the network includes at least one of a local network at the caller location, a local network at a callee location, and a network between the caller location and the callee location.

15. A non-transitory medium storing computer-executable instructions for a method for presenting voice quality different from signal strength of a specific potential VoIP voice call over a VoIP network before the specific potential VoIP call is made, the method comprises:
obtaining a caller location;
obtaining a condition of the network relating to voice quality of as the specific potential call to be processed by the network;
predicting a voice quality different from signal strength of the specific potential voice call over the network based upon the condition of the network and the caller location calculated as a VoIP voice quality of a model VoIP session of the VoIP network for delivery of the potential VoIP call;
obtaining a mapping between the condition of the network and the voice quality of the potential call; and
displaying the voice quality of the specific potential voice call prior to completing the potential call to enable the caller to determine if the specific potential call should be placed based upon the voice quality.

16. The medium of claim 15, wherein the network includes a local network at the caller location.

17. The medium of claim 15, wherein the network includes a local network at callee location.

18. The medium of claim 15, wherein the network includes a network between the caller location and a callee location.

19. The medium of claim 15, wherein displaying the quality of the voice call comprises:
providing a bar indicator; and
displaying a portion of the bar indicator, wherein a greater displayed portion corresponds to a better quality of the potential voice call.

20. The medium of claim 15, wherein displaying the quality of the voice call comprises:
providing a light indicator, wherein the indicator can display a plurality of colors and each of the plurality of colors corresponds to a specific quality of the potential voice call.

21. The medium of claim 15, the method further comprises: assessing the condition of the network.

22. The medium of claim 15, wherein the medium is stored on a soft phone or a wireless VoIP phone.

23. The medium of claim 15, wherein the medium is stored on a laptop or a desktop and wherein the voice quality is determined in terms of customer perception.

* * * * *